(12) United States Patent
Lee et al.

(10) Patent No.: US 8,489,938 B2
(45) Date of Patent: Jul. 16, 2013

(54) DIAGNOSTIC DATA CAPTURE IN A COMPUTING ENVIRONMENT

(75) Inventors: Phil R. Lee, Winchester (GB); Roger G. Lewis, Southampton (GB); Ian J. Mitchell, Eastleigh (GB); Alan C. Robinson, Southampton (GB); Andy Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/876,701

(22) Filed: Sep. 7, 2010

(65) Prior Publication Data

US 2011/0072310 A1 Mar. 24, 2011

(30) Foreign Application Priority Data

Sep. 18, 2009 (EP) .................................... 09170632

(51) Int. Cl.
*G06F 11/00* (2006.01)
(52) U.S. Cl.
USPC .............................................................. 714/45
(58) Field of Classification Search
USPC .............................................................. 714/45
See application file for complete search history.

(56) References Cited

U.S. PATENT DOCUMENTS

| | | | | |
|---|---|---|---|---|
| 5,295,141 | A * | 3/1994 | Person | 714/724 |
| 5,958,077 | A * | 9/1999 | Banerjee et al. | 714/738 |
| 6,671,869 | B2 * | 12/2003 | Davidson et al. | 716/117 |
| 6,918,059 | B1 * | 7/2005 | Galuten et al. | 714/31 |
| 7,359,831 | B2 | 4/2008 | Shrivastava et al. | |
| 7,376,534 | B2 | 5/2008 | Shrivastava et al. | |
| 7,395,458 | B2 | 7/2008 | Shrivastava et al. | |
| 7,502,961 | B2 * | 3/2009 | van Ingen et al. | 714/21 |
| 7,523,348 | B2 * | 4/2009 | Anand et al. | 714/16 |
| 7,627,785 | B1 * | 12/2009 | Grodnik et al. | 714/38.14 |
| 2003/0110464 | A1 * | 6/2003 | Davidson et al. | 716/17 |
| 2005/0273667 | A1 * | 12/2005 | Shrivastava et al. | 714/38 |
| 2006/0053182 | A1 * | 3/2006 | Sen et al. | 707/204 |
| 2007/0220085 | A1 * | 9/2007 | Hambleton et al. | 709/203 |
| 2007/0239500 | A1 * | 10/2007 | Barrett et al. | 705/7 |
| 2008/0201333 | A1 * | 8/2008 | Rowley | 707/10 |
| 2009/0037302 | A1 * | 2/2009 | Schulz | 705/30 |
| 2009/0212101 | A1 * | 8/2009 | Tan | 235/375 |
| 2010/0042875 | A1 * | 2/2010 | Grodnik et al. | 714/38 |
| 2011/0225464 | A1 * | 9/2011 | Guday et al. | 714/48 |

* cited by examiner

*Primary Examiner* — Kamini Patel
(74) *Attorney, Agent, or Firm* — Yee & Associates, P.C.; Yeen Tham (57) ABSTRACT

A method in a multithreaded computing environment for capturing diagnostic data, the method comprising the steps of: in response to a determination that the computing environment is in a predetermined invalid state, a first thread recording diagnostic data for the computing environment, wherein the determination includes a verification that the invalid state corresponds to a state other than a transient state of the computing environment corresponding to a transition of the computing environment by a second thread from a first valid state to a second valid state. An apparatus and computer program element for providing such diagnostic data capture are also provided.

15 Claims, 5 Drawing Sheets

DIAGNOSTIC DATA CAPTURE IN A COMPUTING ENVIRONMENT

BACKGROUND

1. Field

The present invention relates to diagnostic data capture in a computer environment upon determination of an invalid state. In particular it relates to a verification of the invalid state.

2. Description of the Related Art

Multithreaded computing environments are capable of executing multiple threads of executing software at the same time. Such environments can involve one or more computer systems including multiple processors or single processors capable of executing multiple instructions contemporaneously.

Problem determination and resolution in such environments draws upon software and hardware tools to assist in diagnosis. Typically, there is the ability to record information about the flow of events through software code in the computing environment. For example, in IBM CICS products, a facility is provided known as "CICS Trace" (IBM and CICS are registered trademarks of International Business Machines Corporation in the United States, other countries, or both). It allows a chronological sequence of events to be captured as a thread of execution moves through different software programs in a computing environment.

Sometimes there is a need to capture problem determination diagnostics when a particular event (or sequence of events) has taken place, where the existing diagnostic data provided in a trace is insufficient to resolve a particular problem. Monitoring and diagnostic logic can be implemented in software to monitor the state of the computing environment and capture diagnostic data when the state is determined to indicate an unstable, ineffective or erroneous state of operation. Such states can be known as invalid states of execution. In the example of CICS, this can be achieved using a program known as "DFHTRAP" which can analyze the state of a computing environment at specific points in its execution and make decisions as to whether diagnostic data should be captured depending upon the state of the environment at those points in time.

In computing environments implemented to execute in a single-threaded manner, where only a single series of logical operations can execute at a time, the monitoring and diagnostic logic which analyzes the state of the environment can be certain that the state is static at the time it is being analyzed. This means that if an invalid state is detected it represents an instance of failure and so it is correct to capture diagnostic data for it.

However, in multithreaded computing environments such as CICS Transaction Server with multiple open task control blocks (TCBs), there is the potential for the state of the computing environment to change while the environment is being monitored. Such changes of state can take place because threads of execution other than a monitoring and diagnostic thread continue to execute and potentially change the state of the computing environment at the same time as the monitoring operation. This can lead to the environment appearing to be in an invalid state when in fact it is the result of another thread changing the state of the environment at that same moment in time.

Operations that can be problematic in multithreaded computing environments include, for example: the addition or removal of list items to/from a linked list data structure; the updating of instance data; the incrementing or decrementing of counters (such as above or below thresholds); etc. Such operations do not ultimately result in an invalid state of the computing environment but can involve transitioning through a transient state that can be seen to be invalid if not understood in the context of the overall operation. For example, the addition of an item to a linked list data structure can, momentarily, result in a newly created list item containing uninitialized (and consequently invalid) memory references (pointers). Monitoring and diagnostic logic analysing such data could conclude an invalid state due to the invalid memory reference when in fact the state is merely transient and, when considered as part of the overall operation of adding a new linked list item, the operation will conclude with a valid list item entry with no invalid memory references. Similarly, the incrementing of a counter which causes the counter to exceed a predetermined threshold can, momentarily, result in a determination of an invalid state by monitoring and diagnostic logic since the threshold is exceeded. In fact the state is merely transient and, when considered as part of the overall operation of incrementing a counter and checking for the breach of a threshold before resetting the counter, the operation will conclude with a valid state. Accordingly, false positive determinations of invalid state by monitoring and diagnostic logic can arise in multithreaded computing environments and can result in the unnecessary collection of diagnostic data.

In a busy production environment, such as an online transaction processing environment like CICS, the capturing of unnecessary diagnostic data can result in a major degradation of performance. The obvious solution is to synchronize the computing environment during the monitoring and diagnostic operation such as by forcing the environment to suspend all threads other than the monitoring and diagnostic thread while the monitoring and diagnostic logic executes. Such synchronization imposes unfeasible performance bottlenecks on the computing environment as all threads are suspended every time monitoring takes place resulting in poor performance.

Accordingly, it is presently not possible to capture diagnostic data for invalid states of a computing environment without the potential to also capturing diagnostic data due to valid transient changes in the environment's state, and so incur a performance degradation arising from the unnecessary collection of diagnostic data.

SUMMARY

The present invention accordingly provides, in a first aspect, a method in a multithreaded computing environment for capturing diagnostic data, the method comprising the steps of: in response to a determination that the computing environment is in a predetermined invalid state, a first thread recording diagnostic data for the computing environment, wherein the determination includes a verification that the invalid state corresponds to a state other than a transient state of the computing environment, the transient state corresponding to a transition of the computing environment by one or more other threads from a first valid state to a second valid state.

Thus, the determination that the invalid state corresponds to a state other than a transient state provide for the advantageous determination of whether an identified invalid state is actually a transient state arising due to a transition from a first valid state to a second valid state or a true invalid state. Only where an invalid state is determined to be other than a transient state will resources be invested in generating diagnostic data by the diagnostic data capture tool. In this way, false positive determinations of invalid state can be reduced.

The present invention accordingly provides, in a second aspect, an apparatus in a multithreaded computing environment for capturing diagnostic data, the apparatus comprising a recorder for, in response to a determination that the computing environment is in a predetermined invalid state, a first thread to record diagnostic data for the computing environment, wherein the determination includes a verification that the invalid state corresponds to a state other than a transient state of the computing environment, the transient state corresponding to a transition by at least one other thread from a first valid state to a second valid state.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE SEVERAL VIEWS OF THE DRAWINGS

A preferred embodiment of the present invention is described below in more detail, by way of example only, with reference to the accompanying drawings, in which.

DETAILED DESCRIPTION

Figure 1:
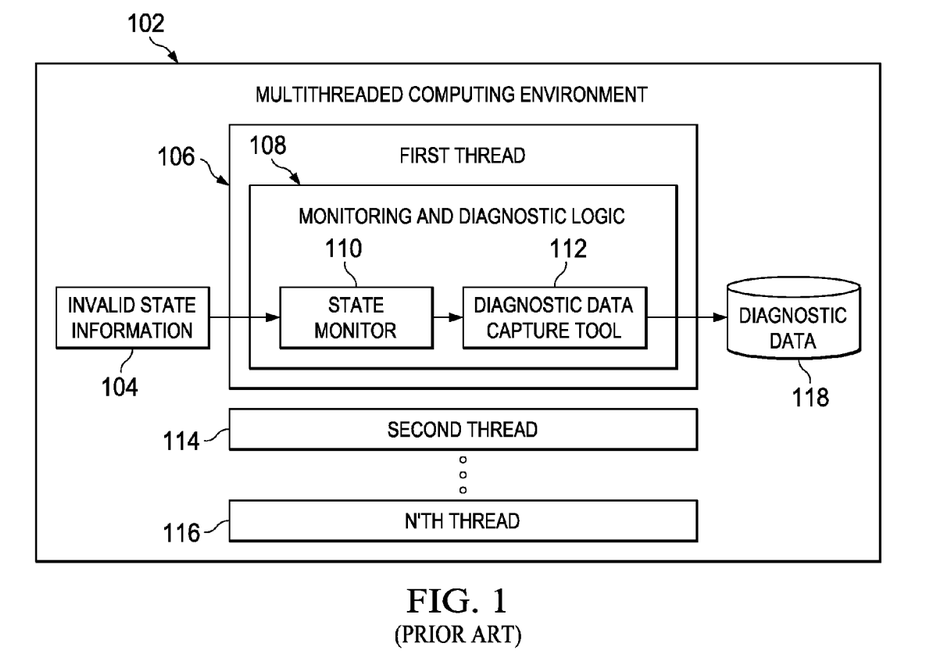
FIG. 1 is a block diagram of a multithreaded computing environment including monitoring and diagnostic logic for the collection of diagnostic data when the multithreaded computing environment is in an invalid state in accordance with the prior art.

FIG. 1 is a block diagram of a multithreaded computing environment 102 including monitoring and diagnostic logic 108 for the collection of diagnostic data 118 when the multithreaded computing environment is in an invalid state in accordance with the prior art. The multithreaded computing environment 102 includes multiple software threads 106, 114, 116. Each thread is a separate stream of software execution and includes software instructions. Threads 106, 114, 116 can also include thread data normally stored in an area of storage in a computer system known as a memory stack. Threads 106, 114 and 116 execute substantially contemporaneously in one or more computer systems such as a multiprocessor computer system, a system comprising a plurality of sub-processors for the execution of multiple software instructions at the same time (such as a multi-core processor), or a computing environment having multiple computer systems communicatively connected for the execution of one or more software applications. Alternatively, threads 106, 114 and 116 can execute within a single processor on a multiplexed or channelled basis such that the single processor is shared between the multiple threads such that the threads can execute substantially concurrently while individual instructions are processed one at a time. For example, a processing unit can divide its processing between the multiple threads on a round robin, time shared or priority driven basis.

First thread 106 includes the execution of monitoring and diagnostic logic 108 which monitors the execution of all or part of the computing environment 102 for problematic states of operation that correspond to invalid states. The first thread 106 can be dedicated to the monitoring and diagnostic logic 108. Alternatively, the monitoring and diagnostic logic 108 can execute as part of thread 106 that is also used for the execution of other software operations, such as software application operations. For example, the monitoring and diagnostic logic 108 can be executed periodically according to a predetermined schedule or when conditions in the computing environment allow, such as when workload of the environment is sufficiently heavy or light.

The monitoring and diagnostic logic 108 includes a state monitor 110 which is a software routine for monitoring the execution of software operations in threads 106, 114 and 116 to identify an invalid state. Further, the state monitor 110 monitors one or more data stores (not illustrated) for the computing environment 102, such as volatile or non-volatile memories associated with the computing environment 102, for invalid data states. For example, such memories can include one or more memory heaps for the computing environment 102.

In this way, the state monitor 110 is able to determine invalid states falling into two general categories: invalid states indicated by the contents of data in a data store of the computing environment, such as data that appears corrupt or incomplete; and invalid states indicated by a sequence of events taking place in the computing environment 102, such as processing actions taking place in one or more threads in the computing environment 102 that are erroneous or indicative of an erroneous state.

The state monitor 110 identifies an invalid state of the computing environment 102 with reference to predetermined invalid state information 104 which provides a definition of rules, criteria or characteristics of invalid states for the computing environment 102. Invalid state information 104 can be stored in a memory of the computing environment, such as a volatile or non-volatile storage, a heap memory, disk or tape, flash memory or any other suitable memory. The invalid state information 104 can be organised in a structured data format, such as a data structure, or alternatively in a format that can be parsed such as XML or other semantic data format. Additionally the invalid state information 104 can be stored in a database.

The invalid state information 104 is suitable for assisting the state monitor 110 in identifying invalid states of the computing environment 102 in the two general categories of invalid state described above. For example, an invalid state indicated by the contents of data in a data store of the computing environment 102 can be represented in invalid state information 104 as a set of criteria characterising invalid data. An invalid reference (such as a pointer) may include a memory address that is outside an addressable range or that indicates a memory location within a secure or protected range of memory that is not, or should not be, directly addressable. Invalid state information 104 can include indications of invalid memory references such that the state monitor 110 can identify such invalid memory references in a data store of the computing environment 102 to identify an invalid data state.

In a second example, an invalid state arising due to a counter data item exceeding a predetermined threshold can be represented in invalid state information 104 by identifying the valid range or maximum or minimum values of the counter such that the state monitor 110 can identify invalid counter values in a data store of the computing environment 102 to identify an invalid data state.

In a third example, an invalid state arising due to a sequence of events involving the execution of error or exception handling or catching operations can be represented in invalid state information 104 such that the state monitor 110 can identify sequences of events involving such operations to identify an invalid state (such as corresponding to an error or exception state) in the computing environment 102.

Monitoring and diagnostic logic 108 further includes diagnostic data capture tool 112 adapted to capture diagnostic data 118 in response to a determination by the state monitor 110 that the multithreaded computing environment 102 is in an invalid state. The diagnostic data capture tool 112 receives, reads or determines diagnostic data from the computing environment 102 including data stored and threads executing in the computing environment 102. For example, diagnostic data can be read as data state recorded in a memory of the computing environment 102, or can be received from threads in response to requests for data made by the diagnostic data capture tool 112, or can be determined by the diagnostic data capture tool 112 on the basis of data available, readable or receivable by the tool. Information recorded by the diagnostic data capture tool 112 as diagnostic data 118 can include: data dumps such as memory dumps including stack, heap and other memory dumps; stack trace information; thread information including thread data dumps, recording thread state information; process and resource information including memory, disk, peripheral state information and other information as will be known to those skilled in the art. The diagnostic data 118 is recorded to a data store such as a suitable non-volatile or volatile memory or storage device.

Thus, in the prior art arrangement depicted in FIG. 1, monitoring and diagnostic logic 108 monitors, by state monitor 110, the state of the computing environment 102 including stored data and operations occurring in threads 106, 114 and 116 to identify an invalid state in accordance with invalid state information 104. When the state monitor 110 identifies an invalid state the diagnostic data capture tool 112 receives, reads or determines diagnostic data in the computing environment and stores the diagnostic data to a diagnostic data store 118. In the prior art arrangement of FIG. 1 it is not possible to capture diagnostic data for invalid states of a computing environment without the potential to also capturing diagnostic data due to valid transient changes in the environment's state, and so incur a performance degradation arising from the unnecessary collection of diagnostic data. In particular, transient changes in the environment's state can take place in one or both of threads 114 and 116 at the same time as thread 106 is undertaking state monitoring operations.

Preferred embodiments of the present inventions seek to address this problem as set out below with reference to FIGS. 2 to 7.

Figure 2:
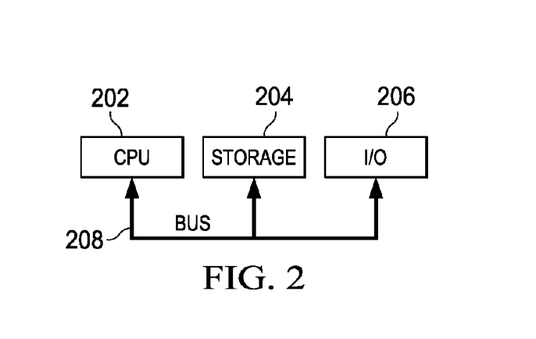
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
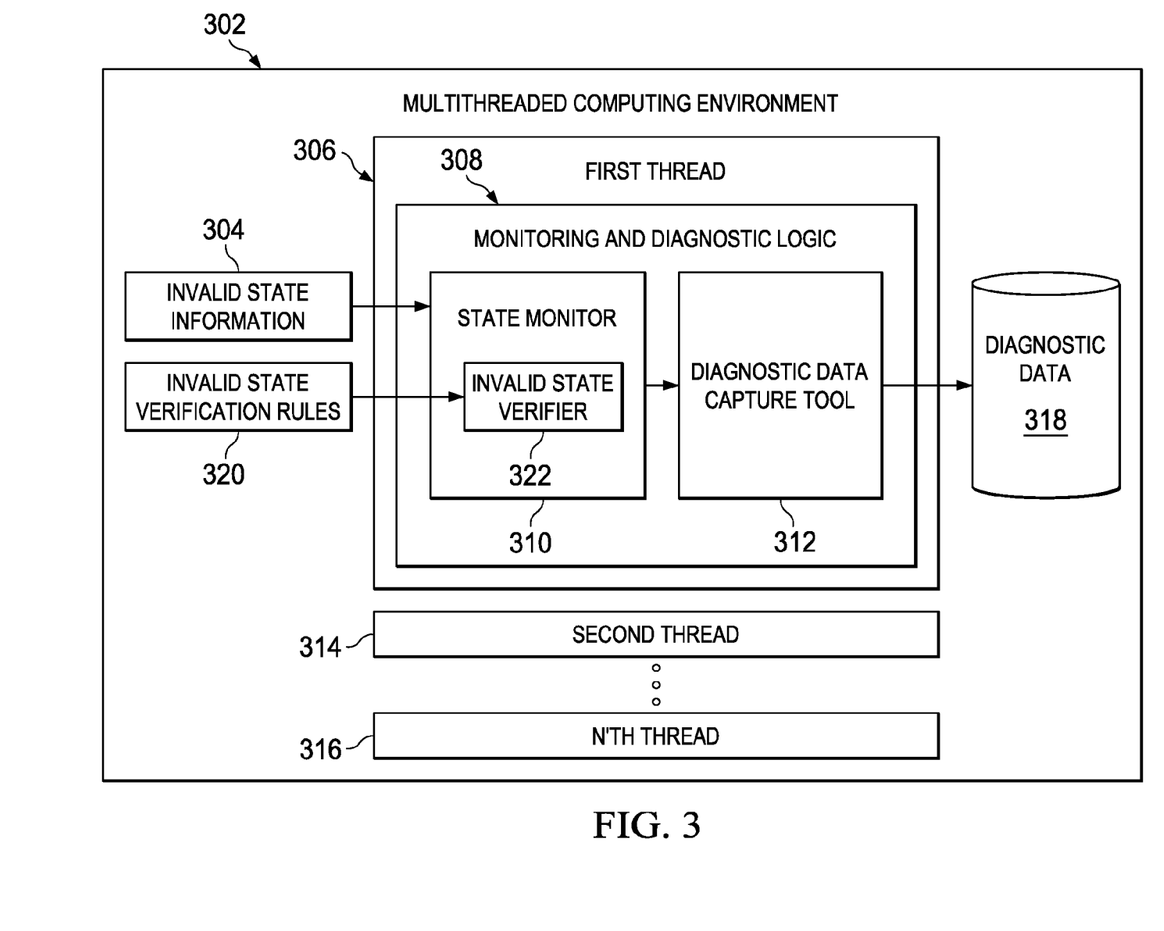
FIG. 3 is a block diagram of a multithreaded computing environment including monitoring and diagnostic logic for the collection of diagnostic data when the multithreaded computing environment is in an invalid state in accordance with a preferred embodiment of the present invention.

FIG. 3 is a block diagram of a multithreaded computing environment 302 including monitoring and diagnostic logic 308 for the collection of diagnostic data 318 when the multithreaded computing environment is in an invalid state in accordance with a preferred embodiment of the present invention. Many of the elements of FIG. 3 are identical to those described above with respect to FIG. 1 and these will not be repeated here.

The monitoring and diagnostic logic 308 of FIG. 3 further includes an invalid state verifier 322 for verifying that an invalid state identified by the state monitor 310 corresponds to a state other than a transient state of the computing environment 302. A transient state arises due to a transition of the computing environment 302 by threads from a first valid state to a second valid state. Such a transition will be caused by threads other than the first thread 306 that execute at the same time as the first thread 306 when the first thread 306 is undertaking monitoring and diagnostic operations. A valid state is a state that could not be determined to be an invalid state with reference to the invalid state definitions in the invalid state information 304. An invalid state detected by the state monitor 310 can be an invalid state and a transient state because, in multithreaded computing environment 302, other threads executing concurrently with the thread 306 of the monitoring and diagnostic logic 308 can affect the state of the computing environment 302 while the monitoring and diagnostic logic 308 is executing.

Examples of invalid states that arise due to a transition from a first valid state to a second valid state and so constitute an invalid but transient state include:

The addition of an item to a linked list data structure where a newly created list item contains uninitialized (and consequently invalid) memory references (pointers). While the memory references are uninitialized the computing environment 302 is in an invalid state. However, the invalid state arises between the valid state before the new list entry is created and the valid state when the new list entry is properly integrated into the linked list data structure. Thus, the invalid state constitutes a transient state between two valid states.

The incrementing of a counter which causes the counter to exceed a predetermined threshold. While the counter exceeds the threshold the computing environment 302 is in an invalid state. However, the invalid state arises between the valid state of the counter before incrementing and the valid state after software detects that the counter exceeds the threshold and resets the counter. Thus, the invalid state constitutes a transient state between two valid states.

A sequence of software operations that correspond to catching an exception where an exception handler is implemented to retry a failed operation which subsequently succeeds. At the moment the exception handler is entered, the computing environment is in an invalid state (an exception state). However, the invalid state arises between a valid state before the exception and a valid state after processing the exception handler to retry the operation to achieve success. Thus, the invalid state constitutes a transient state between two valid states.

Additional scenarios where an invalid state arises as a mere consequence of normal processing during a transient state between two valid states will be apparent to the person skilled in the art.

The invalid state verifier 322 performs verification with reference to invalid state verification rules 320. The invalid state verification rules 320 are rules for identifying one or more transient states, and are accordingly also suitable for verifying that an invalid state identified by the state monitor 310 is not a transient state. The invalid state verification rules 320 can include rules relating to data stored in the computing environment 302, or rules relating to sequences of events undertaken in the computing environment 302. The invalid state verification rules 320 are illustrated as being stored outside the monitoring and diagnostic logic 308, but it will be apparent to those skilled in the art that these rules can be stored in any suitable location and form for use by the invalid state verifier 322, such as in a database, a volatile or non-volatile memory of the computing environment 302, in thread data for the first thread 306, within the invalid state verifier 322 or any other suitable storage location.

For example, a data rule may indicate that a memory reference having a value of zero ('0' or '0x00') is an uninitialized memory reference and constitutes a transient state (between the creation of the reference and the initialization of its memory address value) that should not constitute an invalid state. In a further example, rules based on a sequence of events may indicate that a sequence of events, including the walking of a linked list data structure and the creation of a new list item, constitute a sequence of events normally undertaken when adding a new item to a linked list. Accordingly, a series of operations corresponding to such a sequence of events should not constitute an invalid state.

Thus, in use, the state monitor 310 identifies an invalid state of the computing environment 302 by reference to the invalid state information 304, and verifies that the invalid state is not a transient state using the invalid state verifier 322 which checks with definitions of transient states in the invalid state verification rules 320. Where the invalid state is confirmed to be a state other than a transient state by the invalid state verifier 322, the diagnostic data capture tool 312 captures diagnostic data 318 as described above. In this way, the monitoring and diagnostic logic 308 captures diagnostic data 318 when the state of the computing environment 302 is an invalid state but not when the state is a transient state between valid states.

Figure 4:
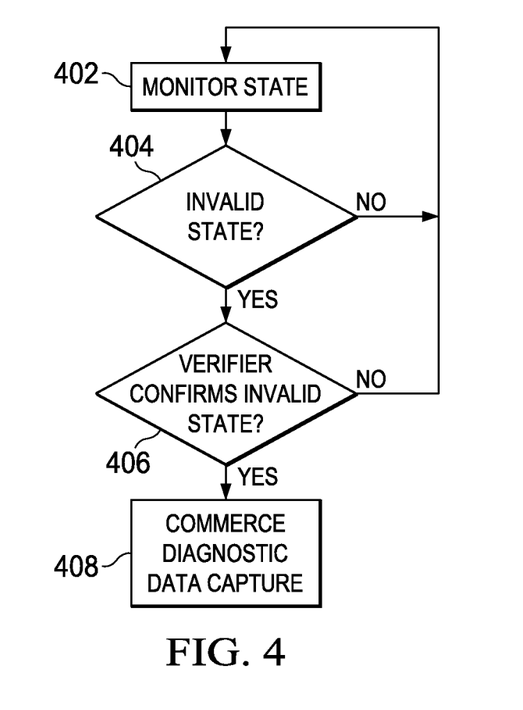
FIG. 4 is a flowchart of the operation of the monitoring and diagnostic logic of FIG. 3 in accordance with a preferred embodiment of the present invention.

FIG. 4 is a flowchart of the operation of the monitoring and diagnostic logic 308 of FIG. 3 in accordance with a preferred embodiment of the present invention. At step 402 the state monitor 310 monitors the state of the computing environment 302. At step 404 the state monitor 310 determines if the computing environment 302 has entered an invalid state with reference to the invalid state information 304. If an invalid state is identified, the invalid state verifier 322 verifies the invalid state corresponds to a state other than a transient state of the computing environment 302 at step 406. If the invalid state is verified, the diagnostic data capture tool 312 generates the diagnostic data 318 at step 408.

Figure 5:
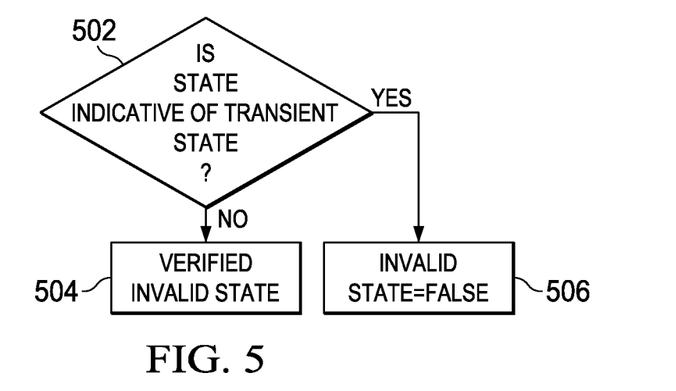
FIG. 5 is a flowchart of the step of FIG. 4 of the invalid state verifier confirming an invalid state in accordance with a preferred embodiment of the present invention.

FIG. 5 is a flowchart of the step 406 of FIG. 4 of the invalid state verifier 322 confirming an invalid state in accordance with a preferred embodiment of the present invention. At step 502, the invalid state verifier 322 determines if the state of the computing environment 302 is indicative of a transient state with reference to the invalid state verification rules 320. If the state is indicative of a transient state, the invalid state verifier 322 returns a false positive indication (non-verification) at step 506 resulting in a negative determination at step 406 of FIG. 4. If the state is not indicative of a transient state, the invalid state verifier 322 verifies the invalid state at step 504 resulting in a positive determination at step 406 of FIG. 4.

Thus the inclusion of the invalid state verifier 322, and the definition of invalid state verification rules 320, provides for the advantageous determination by the state monitor 310 of whether an identified invalid state is actually a transient state arising due to a transition from a first valid state to a second valid state, or a true invalid state. Only where an invalid state is determined to be other than a transient state will resources be invested in generating diagnostic data by the diagnostic data capture tool. In this way false positive determinations of invalid state can be reduced.

Figure 6:
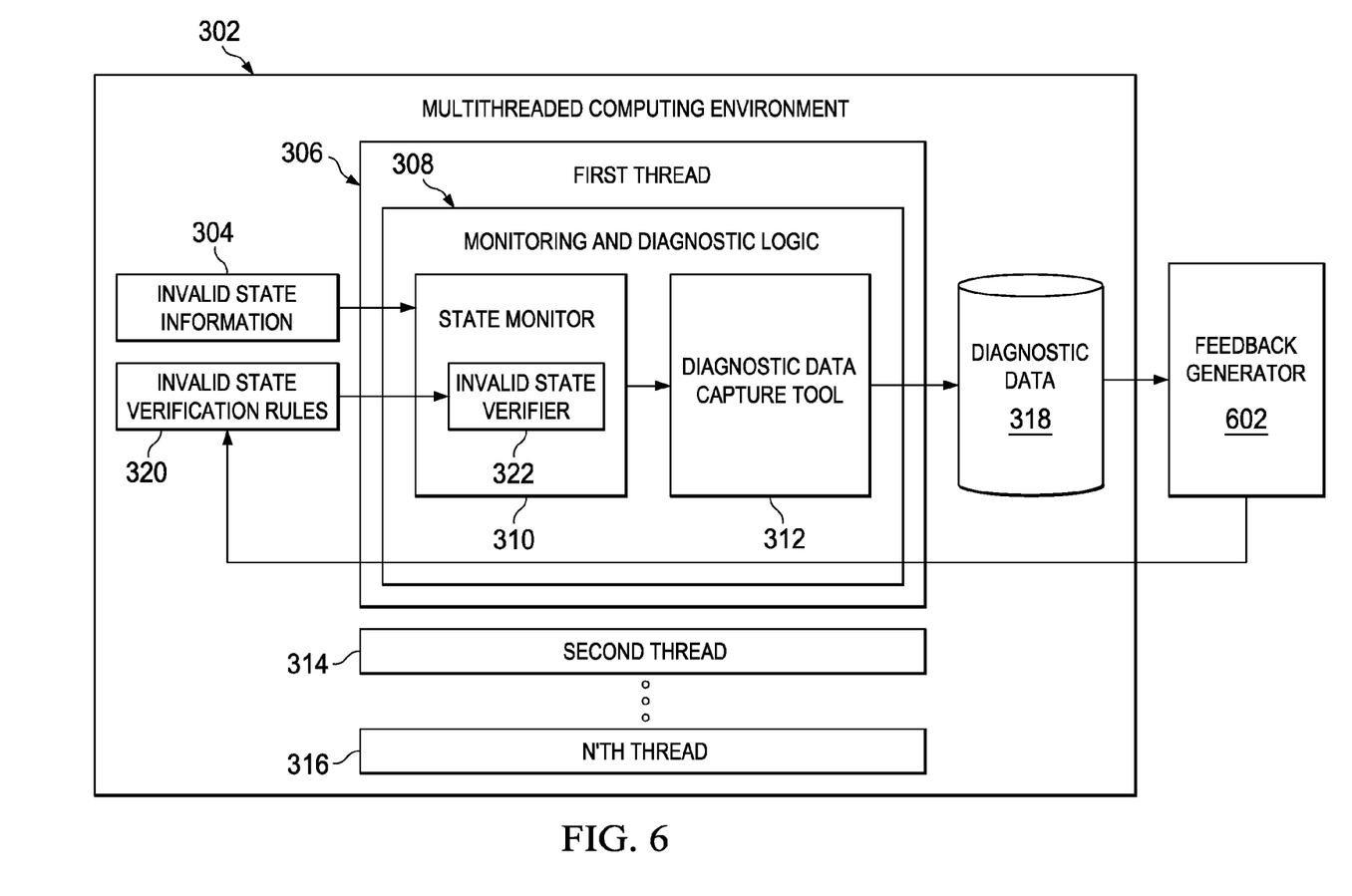
FIG. 6 is a block diagram of a multithreaded computing environment in accordance with FIG. 3 including a feedback generator in accordance with a preferred embodiment of the present invention.

Further advantages can be realized by providing further enhancements to the state monitor 310 as described below with respect to FIGS. 6 and 7. FIG. 6 is a block diagram of a multithreaded computing environment 302 in accordance with FIG. 3 including a feedback generator 602 in accordance with a preferred embodiment of the present invention. Many of the features of FIG. 6 are identical to those described above with respect to FIG. 3 and these will not be repeated here. FIG. 6 further includes a feedback generator 602 which is a software component for providing feedback relating to the generated diagnostic data 318. The feedback can arise automatically from a software determiner or from an operator of the computing environment 302. For example, automatic determination of a false positive invalid state can be made in a computing environment 302, where diagnostic data 318 is captured despite the computing environment 302 continuing to operate on a stable basis (i.e. no actual fault, error or exception). The feedback provided by the feedback generator 602 reflects whether the diagnostic data 318 was captured appropriately. Diagnostic data 318 that is captured when the computing environment 302 is in an invalid state is considered to be appropriately generated because an investment of resources in the generation of such diagnostic data 318 is a worthwhile part of a problem determination and resolution process. In contrast, diagnostic data 318 captured when the computing environment 302 is in a transient state is considered to be inappropriately generated.

The invalid state verification rules 320 can be predefined, such as by an operator, installer or configurer of the computing environment 302. Alternatively, or additionally, the invalid state verification rules 320 can be adapted based on feedback provided by the feedback generator 602. Where the feedback generator 602 indicates that diagnostic data 318 is inappropriately generated during a transient state, new or adapted verification rules 320 can be generated to detect the transient state in future occurrences.

The adaptation of invalid state verification rules 320 can be undertaken with reference to context information stored for the computing environment 302. Context information is a record of the operating context of the computing environment, such as data state, processing state, operations in progress etc. For example, context information during the addition of an item to a linked list data structure can record: the operation of walking the linked list; the operation of generating a new linked list data item; and the operation of updating memory references to insert the new data item into the linked list. If diagnostic data 318 is generated in response to a false positive determination of an invalid state where an item was being added to a linked list, the feedback generator 602 can identify the false positive determination, and the context information recorded during the operation of adding the new item to the linked list can be used to generate new or adapted invalid state verification rules 320 to identify an equivalent operating context of the computing environment 302 in future. Alternatively, the adaptation of verification rules 320 can be undertaken manually by an operator of the computing environment 302. In these ways, the invalid state verification rules 320 are adapted based on past operation of the computing environment 302.

Figure 7:
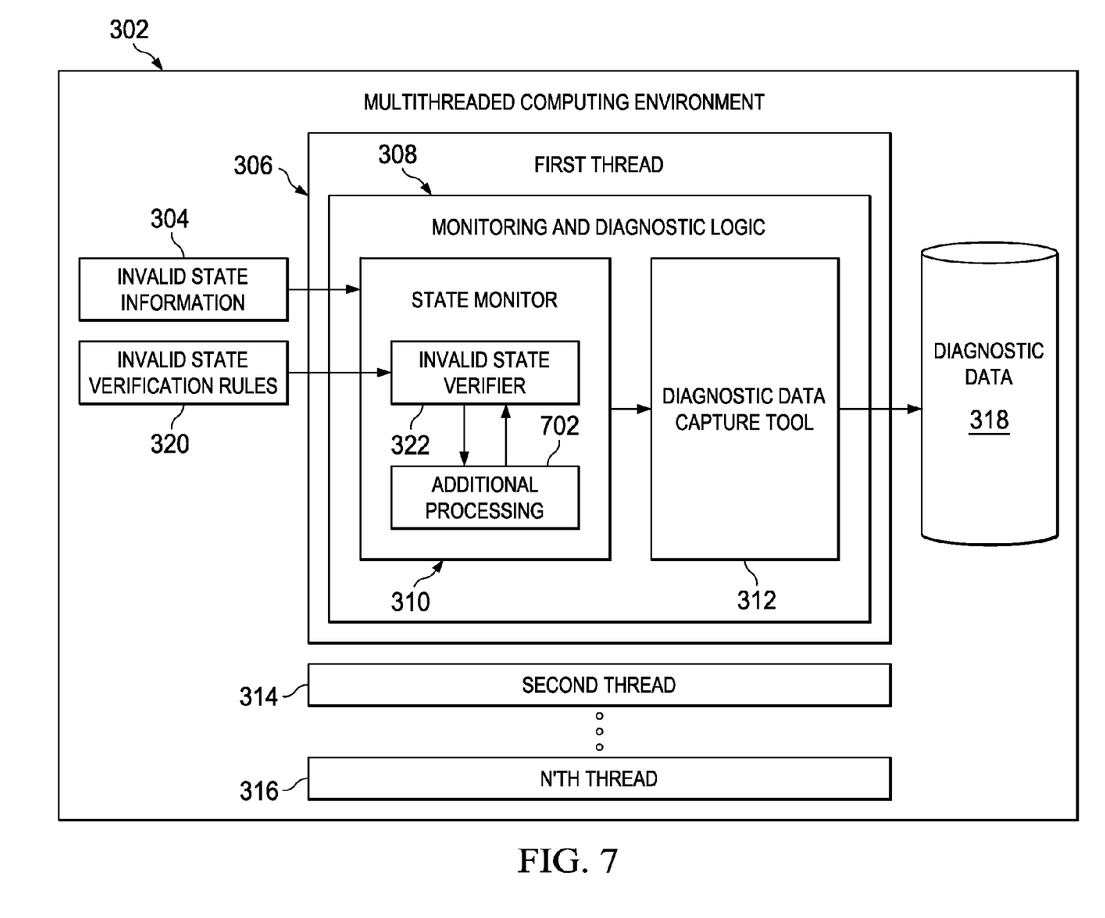
FIG. 7 is a block diagram of a multithreaded computing environment in accordance with FIG. 3 including additional processing in accordance with a preferred embodiment of the present invention.

FIG. 7 is a block diagram of a multithreaded computing environment 302 in accordance with FIG. 3 including additional processing component 702 in accordance with a preferred embodiment of the present invention. Many of the features of FIG. 7 are identical to those described above with respect to FIG. 3 and these will not be repeated here. The state monitor 310 of FIG. 7 further includes an additional processing component 702 for use by the invalid state verifier 322 to undertake the verification that the invalid state corresponds to a state other than a transient state. Additional processing component 702 provides for the inclusion of additional verification logic to be undertaken as part of a determination by the state monitor 310 that a state of the computing environment 302 is not a transient state. The additional processing component 702 is illustrated as being separated from the invalid state verifier 322. It will be apparent to those skilled in the art that the additional processing component 702 could alternatively be integrated with the invalid state verifier 322.

The additional processing component 702 allows invalid state verification to include additional processing that can be defined within the invalid state verification rules 320. For example, additional processing can include repeating a state monitoring action by the state monitor 310 to verify that a detected invalid state persists. Where such repeating indicates absence of an invalid state, the invalid state verifier 322 can conclude a false positive determination. The additional processing can be defined within the invalid state verification rules 320 themselves and executed in or by the additional processing component 702, or alternatively the additional processing can be provided in or by the additional processing component 702 and referenced or required by invalid state verification rules 320 (such as a library of additional processing functions in the additional processing component 702 selectively applied by invalid state verification rules 320).

In a further enhancement, the additional processing can include a delay before a repeat of a state monitoring action by the state monitor 310. For example, during the addition of a new data item to a linked list, an invalid state may be identified by the state monitor 310. The invalid state verifier 322 operating on the basis of invalid state verification rules 320 may repeat the state monitoring action after a predetermined delay, following which completion of the linked list operation is complete. The length of the delay can be determined based on historical measurements taken of the completion of such operations involving transient invalid states.

The embodiments of FIGS. 6 and 7 can be combined such that adaptations to the invalid state verification rules 320 can be made to include additional processing undertaken by additional processing component 702 on the basis of feedback from feedback generator 602. Particular aspects of the invalid state generation rules 320 and the additional processing component 702 can be adapted, including: addition of various numbers of retries of monitoring operations before an invalid state is verified; varying a length of delay before undertaking a retry of a monitoring operation based on feedback relating to how long operations involving transient states typically take; and honing of invalid state verification rules 320 and additional processing component 702 based on feedback to achieve a reduction of the number of false positive indications of invalid state by the state monitor 310.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method in a multithreaded computing environment for capturing diagnostic data, the method comprising the steps of:
   in response to a determination that the computing environment is in a predetermined invalid state, a first thread recording diagnostic data for the computing environment,
   wherein the determination includes a verification that the invalid state corresponds to a state other than a transient state of the computing environment in order to mitigate capturing other diagnostic data for the computing environment due to valid transient changes in the computing environment's state, the transient state corresponding to a transition of the computing environment by one or more other threads from a first valid state to a second valid state.

2. The method of claim 1, wherein the invalid state is indicated by the contents of data in a data store of the computing environment.

3. The method of claim 2, wherein the data is corrupt.

4. The method of claim 2, wherein the data is incomplete.

5. The method of claim 1, wherein the invalid state is indicated by a sequence of events taking place in the computing environment.

6. The method of claim 5, wherein the sequence of events correspond to processing actions taking place in one or more threads in the computing environment.

7. The method of claim 1, wherein the verification is based on one or more rules for identifying transient states.

8. The method of claim 7, wherein the one or more rules are based on previous behavior of the computing environment.

9. The method of claim 8, wherein the one or more rules are identified based on feedback from an operator of the computing environment indicating that a state of the computing environment is a transient state.

10. The method of claim 1, wherein the verification includes the first thread performing additional processing.

11. The method of claim 10, wherein the additional processing includes the first thread repeating the determination that the computing environment is in a predetermined invalid state.

12. The method of claim 11, wherein the additional processing further includes the first thread delaying before repeating the determination.

13. Apparatus, in a multithreaded computing environment of a data processing system comprising a data processor, for capturing diagnostic data, the apparatus comprising a recorder for, in response to a determination that the computing environment is in a predetermined invalid state, a first thread to record diagnostic data for the computing environment, wherein the determination includes a verification that the invalid state corresponds to a state other than a transient state of the computing environment in order to mitigate capturing other diagnostic data for the computing environment due to valid transient changes in the computing environment's state, the transient state corresponding to a transition by at least one other thread from a first valid state to a second valid state.

14. An apparatus comprising: a central processing unit; a memory subsystem; an input/output subsystem; and a bus subsystem interconnecting the central processing unit, the memory subsystem, the input/output subsystem; and the apparatus as claimed in claim 13.

15. A non-transitory computer readable storage medium comprising computer program code stored thereon to, when loaded into a computer system and executed thereon, cause the computer system to perform the steps of the method as claimed in claim 1.

* * * * *